United States Patent [19]

Hungerford

[11] 4,401,702

[45] Aug. 30, 1983

[54] FILM LAMINATE AND PRODUCT POUCH OR TUBE THEREFROM

[75] Inventor: Gordon P. Hungerford, Palmyra, N.Y.

[73] Assignee: Mobil Oil Corporation, New York, N.Y.

[21] Appl. No.: 334,762

[22] Filed: Dec. 28, 1981

[51] Int. Cl.³ .................... B65D 73/00; B65D 1/00; B32B 27/08; B29C 19/06

[52] U.S. Cl. ............................. 428/35; 156/275.5; 156/275.7; 156/334; 206/484; 229/3.5 R; 426/113; 426/127; 426/412; 428/36; 428/517; 428/520

[58] Field of Search ............... 428/517, 520, 35, 36; 206/484; 229/3.5 R; 426/113, 127, 412; 156/275.5, 275.7, 334

[56] References Cited

U.S. PATENT DOCUMENTS

| | | | |
|---|---|---|---|
| 2,200,429 | 5/1940 | Perrin et al. | 526/329 |
| 2,632,921 | 3/1953 | Kreidl | 427/223 |
| 3,239,478 | 3/1966 | Harlan, Jr. | 156/334 |
| 3,453,173 | 7/1969 | Isley et al. | 428/520 |
| 4,066,731 | 1/1978 | Hungerford | 264/216 |
| 4,072,552 | 2/1978 | Ewing | 156/275.5 |
| 4,123,576 | 10/1978 | Kobayashi et al. | 428/517 |
| 4,243,725 | 1/1981 | Wiggins et al. | 428/520 |
| 4,339,502 | 7/1982 | Gerry et al. | 428/517 |

*Primary Examiner*—William R. Dixon, Jr.
*Attorney, Agent, or Firm*—Charles A. Huggett; James F. Powers, Jr.; James P. O'Sullivan, Sr.

[57] ABSTRACT

A flexible film laminate and pouch or tube therefrom comprising two or more layers of polyacrylonitrile homopolymer films adhesively bonded together by means of a layer of a combination of a styrene-butadiene block copolymer and a random terpolymer, said laminate having been subjected to ultraviolet radiation to an extent resulting in a greater bond strength between layers than in the absence of said radiation.

6 Claims, No Drawings

FILM LAMINATE AND PRODUCT POUCH OR TUBE THEREFROM

BACKGROUND OF THE INVENTION

The present invention relates to a flexible film laminate and food or product pouches or tubes therefrom.

Certain packaging applications require that the packaging material constitute a good barrier to the passage of oxygen. For example, the packaging of certain foods require that a minimum of oxygen or air be transmitted to the contents. Cheese is one food product which should be packaged to the exclusion of oxygen.

Oriented polyacrylonitrile (PAN) film has excellent oxygen barrier properties. One shortcoming, however, is that it is not heat sealable to itself. Because of this, it is necessary, therefore, to consider the imposition of an adhesive or bonding system between the PAN layers which will result in acting as an adherent bridge between the two or more layers.

In recent years, the food packaging industry has shown intense interest in the concept of pouch-packed foods which, among other advantages, do not require freezing for their preservation and can therefore dispense with costly and energy intensive refrigerated transportation and storage facilities. Much effort has gone into the development of a flexible food pouch which not only can withstand the rigors of sterilization and later reheating, e.g., microwave heating, and provide various properties which are sufficient to adequately protect the contents during storage, but which also employ materials which are toxicologically safe.

It is an object of the present invention to present polyacrylonitrile homopolymer film laminate or composites of two or more layers bonded together with a unique and effective bonding system.

It is a further object to present a food or product pouch or tube made from said laminate.

SUMMARY OF THE INVENTION

In accordance with the present invention, a flexible film laminate adaptable for use in manufacture of a product pouch or tube for the packaging of food or other commodity, is provided which comprises: two or more layers of polyacrylonitrile homopolymer films adhesively bonded together by means of a layer of a combination of a styrene-butadiene block copolymer and a random terpolymer of from about 30 to about 40 parts by weight of 1,3-pentadiene, about 30 to about 40 parts by weight of a monocyclic terpene; and from about 25 to about 35 parts by weight of alpha methylstyrene, said combination consisting of from about 1 to about 3 parts by weight of the block copolymer to from about 3 to about 1 part by weight of the terpolymer, said laminate having been subjected to ultraviolet radiation to an extent resulting in a greater bond strength between layers than in the absence of said radiation.

DESCRIPTION OF THE PREFERRED EMBODIMENTS

The homopolymer polyacrylonitrile (PAN) film contemplated for lamination is a known material and it can be prepared by the polymerization and film formation methods described in U.S. Pat. No. 4,066,731 to Hungerford (Mobil Oil Corporation) which is incorporated in its entirety herein by reference. It should possess an oxygen permeability rate of less than about 10 cc/100 in.$^2$/24 hr./atm. at 100° F., more preferably less than 0.1 cc/100 in.$^2$/24 hr./atm. at about 73° F., and a water vapor transmission rate preferably less than about 50 g/100 in.$^2$/24 hr. at 100° F. and 90% relative humidity, more preferably less than about 10 g/100 in.$^2$/24 hr. at 100° F.

The aforesaid oxygen and water vapor transmission rates can be determined by various methods known in the art. For example, oxygen transmission rates can conveniently be measured with a Dohrmann Polymeric Permeation Analyzer PPA-1 (Dohrmann Envirotech Corp., Mountain View, Calif.). The Dow cell can also be employed for this purpose in accordance with ASTM D-1434.

The adhesive medium of the present invention is actually a combination of two materials, the first of which is a styrene-butadiene block copolymer, with a monomer ratio of from about 1 to 3:3 to 1, and the other is a random terpolymer of from about 30 to about 40 parts by weight of 1,3-pentadiene; about 30 to about 40 parts by weight of a monocyclic terpene; and from about 25 to about 35 parts by weight of alpha methylstyrene. This combination consists of from 1 to 3 parts by weight of block copolymer and from 3 to about 1 part by weight of the terpolymer. The first material of this combination is a commercially available product, available under the name Kraton 1000, Series Products (Shell Chemical Company, Polymers Division). One material, Kraton 1102, styrene-butadiene block copolymer (about 28% by weight styrene and about 72% by weight 1,4-butadiene) has the following properties determined at about 23° C. on films cast from a toluene solution:

Tensile Strength, psi, 4600;
300% Modulus, psi, 400;
Elongation percent, 880;
hardness, Shore A 62;
Angle Tear Strength-Die C, pli 190;
Specific Gravity, 0.94; and
Solution Viscosity—25% w, cps from a toluene solution, 1200.

The second component of this adhesive combination is a resinous random terpolymer which contains from about 30 to about 40 parts by weight of 1,3-pentadiene, about 30 to about 40 parts by weight of a monocyclic terpene and about 25 to about 35 parts by weight of alpha methylstyrene. Although a preferred monocyclic terpene for employment in the present combination is beta-phellandrene, other monocyclic terpenes, or mixtures thereof, may be employed. These include dipentene, alpha-terpinene, beta-terpinene, alpha-phellandrene, gama-terpinene, terpinolene, sylvestrene, origanene, pyronenes, and the like.

It is preferred that the terpolymer additive exhibit the following properties:

melting point range (ring and ball), 75°-125° C.;
specific gravity 1.08-0.90;
bromine number 6-14;
iodine number 79;
acid value, less than 1;
sponification number, less than 1;
decomposition temperature (in air) 300° C.;
color (in 50% toluene solution) Gardner 6; and
viscosity (in toluene) 70%.

A particularly preferred random terpolymer is prepared by polymerizing a feed stream containing 37.5% by weight 1,3-pentadiene, 37.5% beta-phellandrene and 25% by weight of alpha methylstyrene in a toluene diluent in the presence of an aluminum chloride catalyst. The resulting terpolymer contains 34.0 parts by weight of 1,3-pentadiene, 36.5 parts by weight of beta-phellandrene and 29.5 parts by weight of alpha methylstyrene. This material has a molecular weight (weight average) of 1880, a bromine number of 14, an iodine number 79, a glass transition temperature of 38° C., a viscosity toluene, f to g of 70% and a decomposition temperature (in air) of 300° C.

The individual films comprising the laminate described herein can be prepared in widely varying thicknesses, for example, from about 0.1 mils to about 10 mils, and preferably from about 0.5 mil to about 5 mils. The PAN film laminates can be prepared in any manner which will result in effectively forming the adhesive bond. For example, the combination adhesives, i.e., a styrene-butadiene block copolymer mixed with the random terpolymer, can be deposited on the PAN film out of a suitable solution, e.g., a toluene solution. After drying, the adhesive coated film can then be laminated to a second PAN film. Effective interfacial lamination can be facilitated by the appropriate use of pressure and/or heat. After the several layers have been laminated together an effective bond between the layers is accomplished by irradiating the layer and adhesive combination with an appropriate amount of ultraviolet (UV) radiation. Techniques for irradiating objects with UV are well known to those skilled in the art. The degree of ultraviolet radiation should be such that it will produce a bond of greater strength between the layers than in the absence of said radiation. Typical sources for the UV radiation are a 1 kilowatt, high pressure, water cooled, mercury vapor lamp, or a 140 watt Hanovia UV lamp, type 30600. The distance from the irradiation source to the film will generally depend upon the ultaviolet radiation source but generally will be from about 1 to about 10 inches and preferably from about 1½ to about 5 inches.

EXAMPLE

A strip of biaxially oriented polyacrylonitrile homopolymer film of approximately 0.65 mil thick, is coated with a toluene solution containing 25% by weight solids, with a combination containing 6 parts by weight of a styrene-butadiene block copolymer (Kraton 1102) and 13 parts by weight of a terpolymer of 34 parts by weight of 1,3-pentadiene, 36.5 parts by weight of beta-phellandrene and 29.5 parts by weight of alpha-methylstyrene. This layer is dried at about 230° F. for about 20 minutes.

A corresponding adhesive coated PAN film is pressed to the first film under a modest pressure which is at least sufficient to cause a substantially uniform interfacial contact between the adhesives. The laminate is then heated at about 380° F. for about 45 seconds. This laminate is irradiated with ultraviolet light using a 1 KW, high pressure, water cooled mercury vapor lamp for about 2 minutes and 50 seconds. This will yield a laminate which can be peeled apart but only with high force, i.e., a force significantly greater than 1½ lbs./in.

Attempts to laminate the PAN film with the adhesive material without the contemplated irradiation, will not result in as effective a laminate.

The laminates of this invention can be fabricated into pouches or pipe-like tubes, employing known methods. In accordance with one such procedure, the PAN film can be folded over upon itself and edge sealed with the subject adhesive, in the manner of the foregoing example. Such a pouch can be filled with food or other material, and top sealed and after UV treating, an effective pouch is obtained. It is to be understood that "laminates" as used herein includes both full film width lamination with the UV treated adhesive or comparatively narrow line lamination to form selective bonding of PAN to PAN. Tubes or pipes of PAN can be prepared, for example, by forming the PAN into a cylinder or tube with a slight overlap and placing the adhesive combination between the overlap regions. Thereafter, pressure and/or heat is applied to the line lamination region and the bonded region irradiated with UV.

What is claimed is:

1. A flexible film laminate comprising, two or more layers of polyacrylonitrile homopolymer films adhesively bonded together by means of a layer of a combination of a styrene-butadiene block copolymer, having a monomer ratio of from about 1:3 to about 3:1, and a random terpolymer of from about 30 to about 40 parts by weight of 1,3-pentadiene; about 30 to about 40 parts by weight of a monocyclic terpene and from about 25 to about 35 parts by weight of alpha methylstyrene, said combination consisting of from about 1 to about 3 parts by weight of the block copolymer to from about 3 to about 1 part by weight of the terpolymer, said laminate having been subjected to ultraviolet radiation to an extent resulting in a greater bond strength between layers than in the absence of said radiation.

2. The flexible film of claim 1 in which said adhesive contains from about 6 parts by weight of said styrene-butadiene block copolymer and about 13 parts by weight of said terpolymer.

3. The flexible film laminate of claim 2 wherein said terpolymer contains beta-phellandrene.

4. The flexible film laminate of claim 1 in which the individual layers range from about 0.1 to about 10 mils thickness.

5. A product pouch or tube fabricated from a flexible film laminate which comprises:

two or more layers of polyacrylonitrile homopolymer film adhesively bonded together by means of a combination of a styrene-butadiene block copolymer having a monomer ratio of from about 1:3 to about 3:1, and a random terpolymer of from about 30 to about 40 parts by weight of 1,3-pentadiene; about 30 to about 40 parts by weight of a monocyclic terpene; and from about 25 to about 35 parts by weight of alpha methylstyrene, said combination consisting of from about 1 to about 3 parts by weight of the block copolymer to about 3 to about 1 part by weight of the terpolymer, said laminate having been subjected to ultraviolet radiation to an extent resulting in a greater bond strength between layers than in the absence of said radiation.

6. A method for forming a flexible film laminate comprising adhesively bonding together two or more layers of polyacrylonitrile homopolymer film by means of a layer of a combination of a styrene-butadiene block copolymer, having a monomer ratio of from about 1:3 to about 3:1, and a random terpolymer of from about 30 to about 40 parts by weight of 1, 3-pentadiene, about 30 to about 40 parts by weight of a monocyclic terpene and from about 25 to about 35 parts by weight of alpha methylstyrene, said combination consisting of from about 1 to about 3 parts by weight of the block copolymer to from about 3 to about 1 part by weight of the terpolymer, and thereafter subjecting the bonded region to ultraviolet radiation to an extent resulting in a greater bond strength between layers than in the absence of said radiation.

* * * * *